A. A. ICENHOUR.
GLASS MANUFACTURE.
APPLICATION FILED FEB. 19, 1914.
1,242,444.
Patented Oct. 9, 1917.
3 SHEETS—SHEET 2.
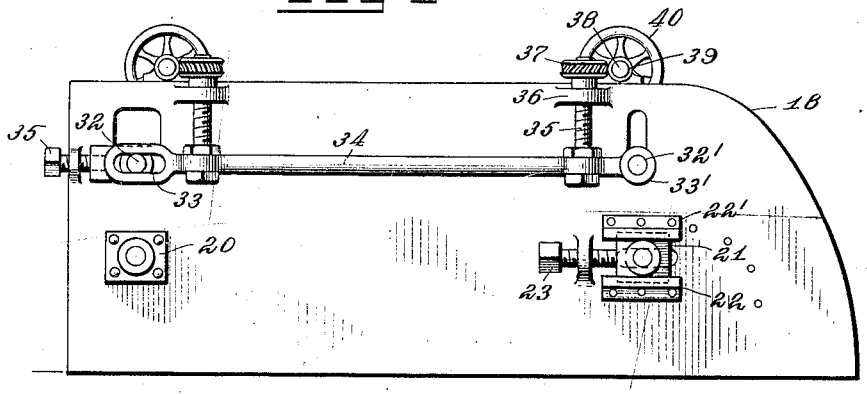
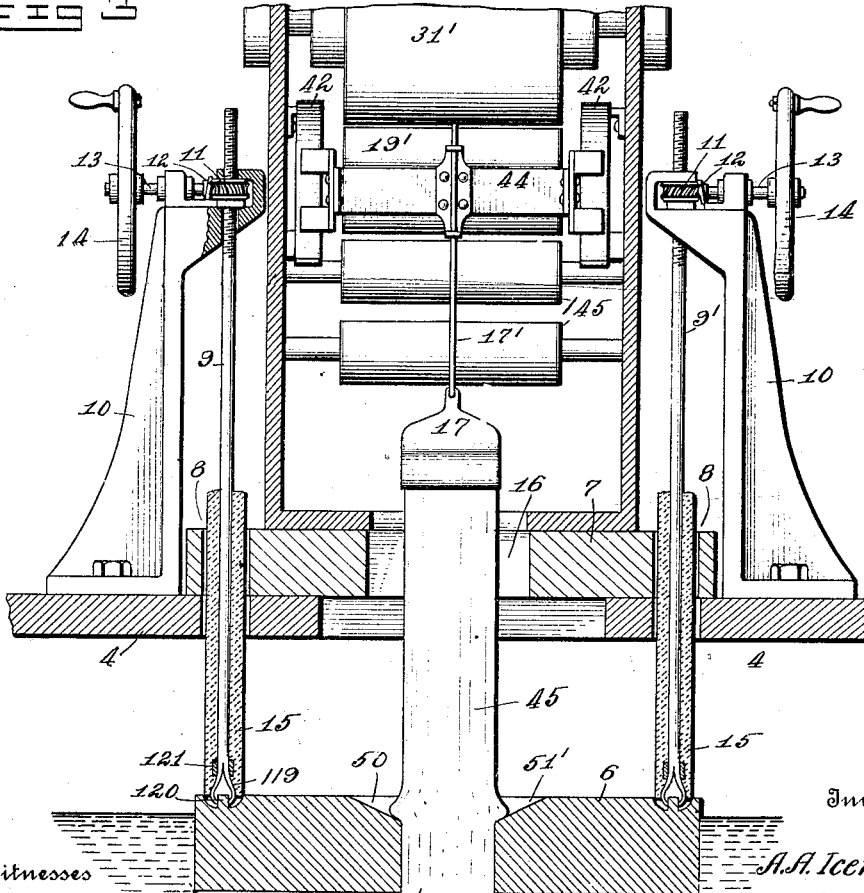
Witnesses
H. C. Robinson
Samuel B. Crandall
Inventor
A. A. Icenhour
By
his Attorney

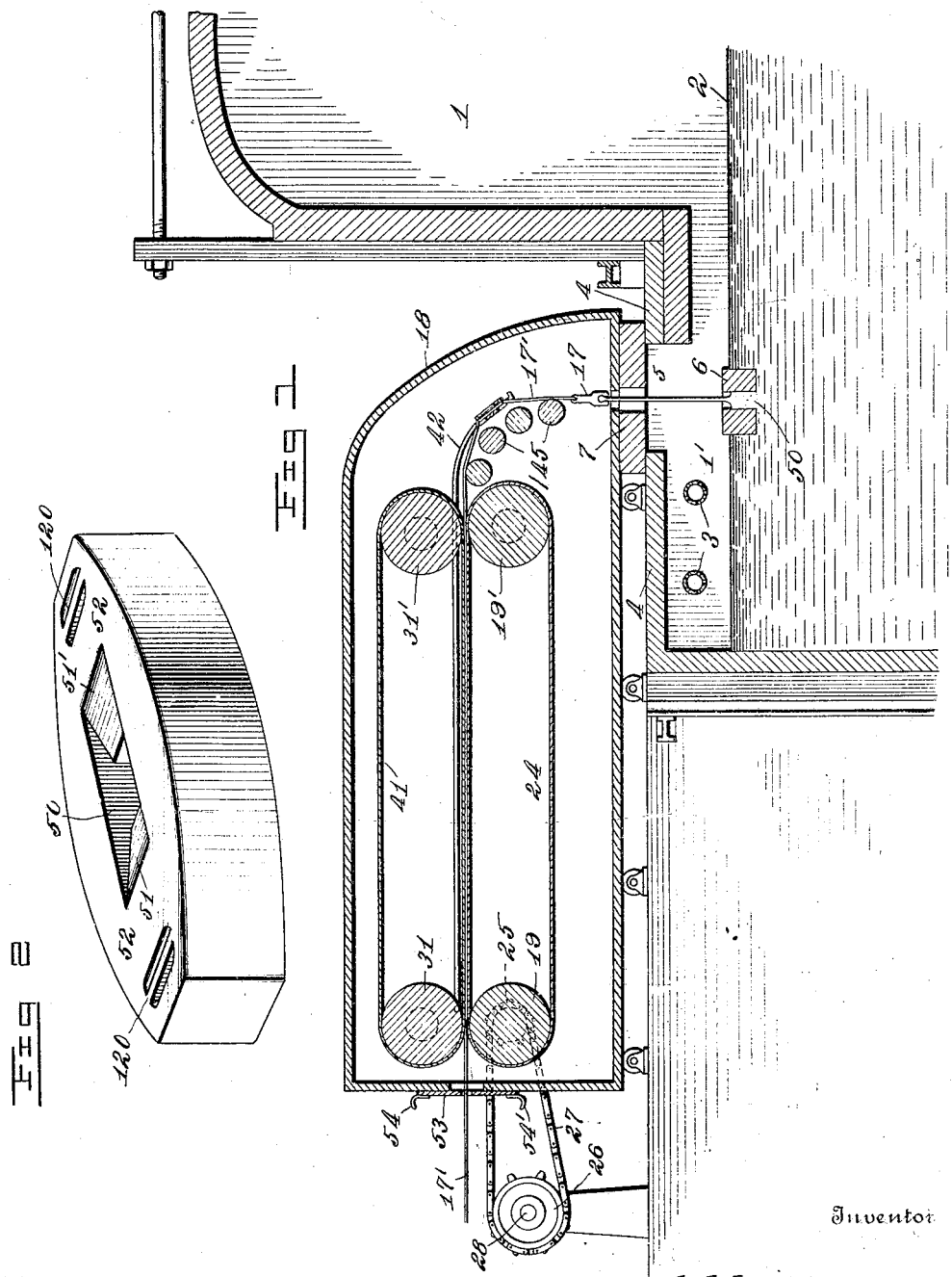

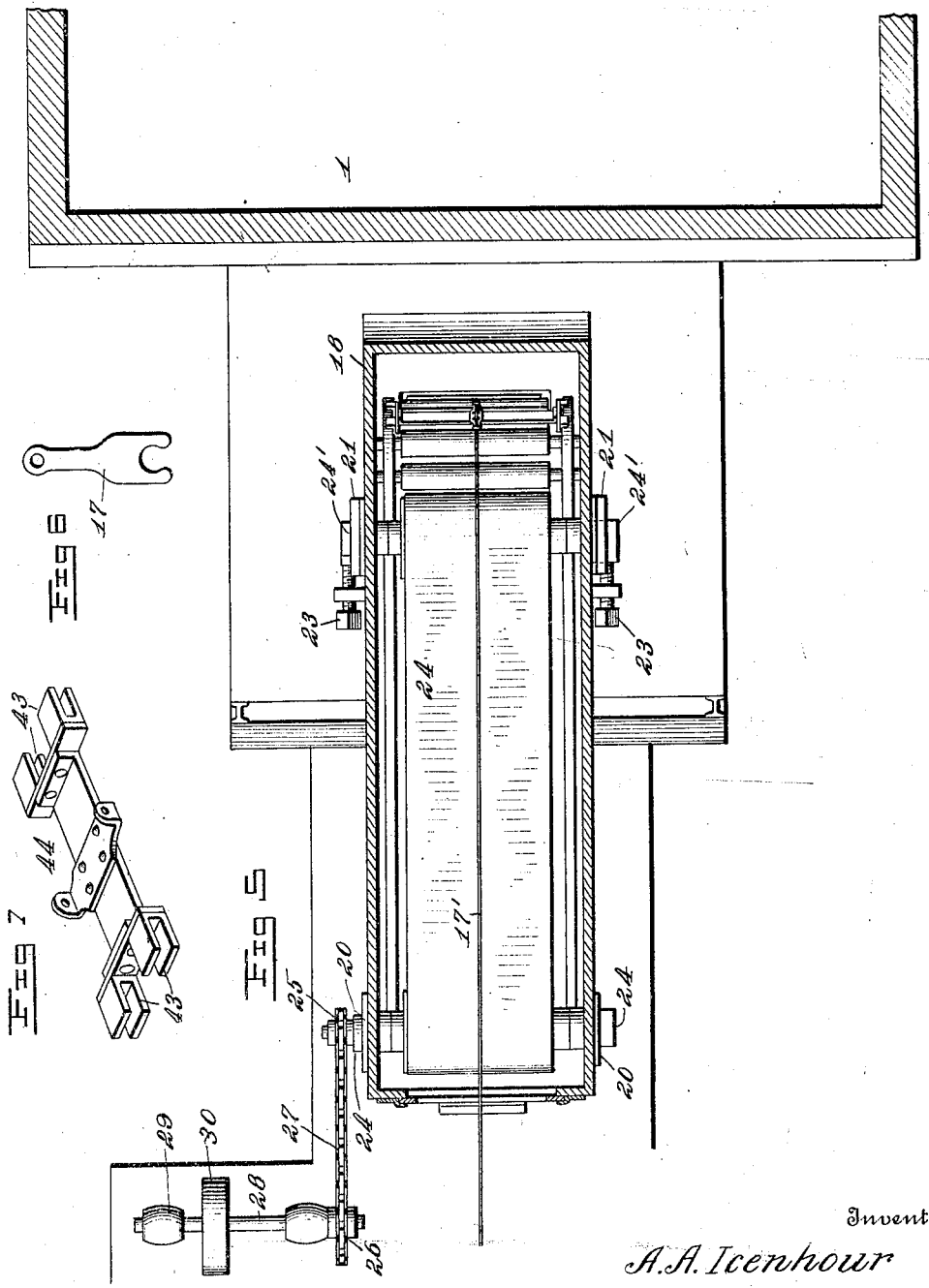

UNITED STATES PATENT OFFICE.

ALBERT A. ICENHOUR, OF ARNOLD, PENNSYLVANIA, ASSIGNOR, BY DIRECT AND MESNE ASSIGNMENTS, OF ONE-TWENTIETH TO PITTSBURGH PLATE GLASS COMPANY, OF PITTSBURGH, PENNSYLVANIA, A CORPORATION OF PENNSYLVANIA, FOUR ONE-HUNDRED-AND-SIXTIETHS TO C. R. SAMMONS, OF PITTSBURGH, PENNSYLVANIA, FOURTEEN ONE-HUNDRED-AND-SIXTIETHS TO LEONARD K. GUILER, NINE ONE-HUNDRED-AND-SIXTIETHS TO BENJAMIN H. THOMPSON, NINE ONE-HUNDRED-AND-SIXTIETHS TO SAMUEL A. GILMORE, AND ONE-FORTIETH TO ARTHUR E. SIXSMITH.

GLASS MANUFACTURE.

1,242,444.      Specification of Letters Patent.     Patented Oct. 9, 1917.

Application filed February 19, 1914. Serial No. 819,632.

*To all whom it may concern:*

Be it known that I, ALBERT A. ICENHOUR, a citizen of the United States, residing at Arnold, in the county of Westmoreland and State of Pennsylvania, have invented certain new and useful Improvements in Glass Manufacture, of which the following is a specification.

This invention relates to an improved process and apparatus for the manufacture of sheet glass, and more particularly to the art of continuously drawing sheet glass.

The primary object of this invention is to dispense with as far as possible the use of manual labor and substitute therefor mechanism which will carry on the complete operation of continuously drawing sheet glass, and to accomplish this the said invention is directed more especially to the establishing and maintenance of the proper temperature of the different portions of the glass from which the sheet is drawn, and to the arrangement and manipulation of certain accessories by which glass may be produced in sheet form of substantially uniform width and thickness without having to undergo the various steps of laterally stretching the edges, annealing and flattening the sheet at intermittent periods as is now the common practice.

By my improved process and apparatus I overcome the many difficulties experienced in the effort to draw sheet glass from a mass of molten glass, principally among which is the difficulty of maintaining the sheet being drawn at a uniform width. This difficulty has been experienced because of the failure to effectively control the consistency of the metal during the drawing operation, as the natural tendency of any material of plastic formation is to narrow itself through any process of drawing until its width becomes substantially uniform with its thickness. I have found that the above difficulties may be overcome by the use of a drawing receptacle of novel construction, which will be hereinafter, together with its functions, more fully described.

By my said invention I am able to produce sheet glass of any pre-determined thickness within the range of commercial window or plate glass by the novel arrangement and manipulation of my improved apparatus.

My invention further consists in the novel construction and arrangement of the parts as will more fully appear from the following description in which reference will be had to the accompanying drawings, which show a form of apparatus embodying my said invention, and wherein, Figure 1, represents in central vertical section a portion of one form of glass tank embodying my present invention, showing in connection therewith in elevation, apparatus in the act of drawing a sheet of glass from said tank.

Fig. 2, is an enlarged perspective view of the glass drawing receptacle.

Fig. 3, is a vertical transversed section of the apparatus on an enlarged scale showing a sheet of glass being drawn.

Fig. 4, is a side view of the conveyer housing showing adjusting mechanism therefor.

Fig. 5, is a plan view of the apparatus.

Fig. 6, is an enlarged view in cross section of the draft bait.

Fig. 7, is a view in perspective of the cross-head guide.

Referring to the accompanying drawings, 1 represents the main portion of a glass tank containing molten glass 2, the heat for which may be supplied in the usual manner as is shown by burners 3 in the side walls, or heat may be supplied in any other manner well known to the art.

Except for that extended portion of the tank wherein the drawing takes place, this tank may be of any desired construction but as to that portion from which the drawing takes place, it is of novel construction especially adapted for carrying out my improved process.

The use of my improved method and apparatus may be adapted to any of the glass tanks now in common use, and for the purpose of applying my device, the extension or drawing chamber 1', is constructed by building out from the main tank, side and end walls comprising an extension or "dog house" as it is commonly called in the art. This extension is provided with a suitable bridge or cap 4, extending over the space inclosed by the side and end walls. The bridge 4 is provided with a suitable opening 5, through which the drawing receptacle 6, may be introduced into the drawing chamber 1'. Over the opening 5, so formed in the bridge, is a movable cover or cap stone 7, designed to cover the aperture 5, in the bridge opening. Through the top stone 7, are suitable apertures 8—8, for extending therethrough the elevating shafts 9—9' which are detachably connected to the drawing receptacle 6.

The elevating shafts 9—9' may be at their lower ends connected to the drawing receptacle 6, in any suitable manner, but preferably of such arrangement as shown in the drawings (Fig. 3) wherein the lower terminal of the shaft 9 is bi-sected vertically and the ends of the tines 119 are curved inwardly so as to registed with, and effectively grip the projecting spline 120, formed in the upper surface of the drawing receptacle 6. To maintain the gripping contact of the extended tines 119, a compressing ring 121, is operatively mounted on the shaft 9 for vertical movement, which being pressed downwardly closes in the curved ends of the tines in operative connection with the drawing receptacle 6. The elevating shafts 9—9' extend upwardly and are operatively mounted in a fixed standard 10, for vertical movement by being screw threaded into a worm gear wheel 11, operatively mounted for rotative movement, and fixedly mounted against vertical movement. Operating to mesh with and rotate the wheel 11, is a worm 12, mounted on the inner end of a horizontal shaft 13, suitably journaled in the upper end of the fixed standard 10, and having at its outer end a suitable hand wheel 14 for rotative movement. Surrounding the vertical shafts 9—9' covering the end portions extending into the drawing chamber 1', are suitable tubular coverings 15, composed of refractory material for protecting the shafts 9—9', from the heat within the drawing chamber 1'. By the operation of the hand wheel 14, elevating movement is imparted to the shaft 9, which is conveyed to the drawing receptacle 6, which is through such movement immersed in the mass of molten glass in the tank at a pre-determined level, and is maintained at such level by the positive position of the elevating shafts 9—9'. The top stone 7, has an additional aperture 16, of rectangular formation through which the glass drawing bait 17 is adapted to be lowered and through which the sheet of glass is to be upwardly drawn. The drawing bait 17, is attached to a suitable cable 17' which passes out through the housing 18, and is suitably connected with any source of motive power.

Located above the bridge 4, over the drawing chamber 1' is a movable housing or leer 18, mounted upon suitable rollers for lateral movement, in which is operatively mounted the glass carrying and drawing mechanism. This mechanism may be of any desired construction though preferably of the design herein shown wherein 19—19', are horizontally disposed rollers mounted on shafts 24—24' for rotative movement. The shafts upon which the rollers 19—19' are mounted extend through the side walls of the housing and the end of the shaft 24, is mounted in the fixed journal 20. The end of the shaft 24' is mounted in a journal 21, which is slidably mounted in the tracks 22—22'. Lateral movement is conveyed to the journal 21 by turning the adjusting screw 23. Similar journals are mounted on the opposite side of the housing.

The rollers 19—19' are incased within an endless belt 24, composed of suitable refractory material, and adapted to receive motion by the rotating movement of the rollers 19—19'. Suitable tension may be applied to the belt 24 by the movement of the journal 21, through the set screw 23, to maintain the top surface of the belt 24, in a horizontal line from the surface of the roller 19 to that of roller 19'.

Rotating movement may be conveyed to roller 19, in any suitable manner. I prefer however to mount on one end of the shaft 24 a suitable sprocket wheel 25 which is operatively connected to sprocket wheel 26 by the sprocket chain 27. The sprocket wheel 26, is mounted on a horizontal shaft 28, which is suitably journaled in the bearings 29. Mounted on the shaft 28 is a suitable pulley 30 adapted to receive a belt from any suitable source of motive power.

Located in the housing 18, and above the plane of the belt 24, is a pair of horizontal rollers 31—31'. These rollers are mounted upon suitable shafts 32—32', which extend through the side walls of the housing 18, and are suitably mounted in bearings 33—33', in opposite ends of the journal rod 34. The journal 33 is operatively mounted in the journal bar 34 for lateral movement and is adjusted by turning the adjusting screw 35.

The journal rod 34 is provided for vertical movement as herein shown. The elevating shafts 35 pass through and are suitably threaded in the journal rod 34. The elevating shaft 35 are suitably mounted for rotative movement in the journal 36, and fixedly mounted against vertical movement. Mounted on the upper end of the elevating shaft 35 is a worm gear 37. Operating to mesh with and rotate the wheel 37 is a worm 38 mounted on the inner end of a horizontal shaft 39 having at its outer end a suitable hand wheel 40, for rotative movement. A similar journal rod and elevating mechanism is mounted on the opposite side of the housing 18.

The rollers 31—31' are incased within an endless belt 41, composed of suitable refractory material. The belt 41 is adapted to receive suitable tension to maintain its top surface in a horizontal position by increasing the distance between the rollers 31—31' by the movement of the journal 33 in which the shaft 32 of the roller 31 is mounted. The belt 41 is adapted to receive movement from its contact with belt 24 or from the moving surface of a sheet of glass interposed between the belts 24 and 41.

Located within the housing 18, and rigidly fixed to the side walls thereof are tracks 42, adapted to carry the cross head 44 shown in Fig. 7. The tracks 42, are composed of suitable angle irons, the horizontal edges of which are adapted to register with the slotted end portions 43, of the cross head. The tracks 42 are horizontal for a portion of their length co-extensive with the horizontal surface of the belts 24 and 41. At a point outside of the rollers 19' and 31' the tracks 42 are curved downwardly to direct the movement of the crosshead with the bait 17, appended thereto, from a horizontal movement to a vertical movement.

Located within the housing 18, below the curved portion of the tracks 42, are a plurality of bending rolls or idlers 145, over which the bait 17 and the sheet of glass 45 are passed in conveying the movement to the sheet of glass from a vertical plane to a horizontal plane. The idlers 145 are composed of suitable refractory material preferably of mica or other mediums capable of retaining a smooth surface.

The drawing receptacle 6, is of such design and construction as to afford a sufficient buoyancy in itself to maintain its upper surface slightly above the surface level of the glass in the tank. From an inspection of Figs. 1 and 2, it will be observed that this receptacle is constructed with an opening 50 through its center, which is rectangular in formation, the cross sectional length of the opening being approximately the same as the width of the sheet of glass to be drawn. The rectangular opening 50 extends in an approximately uniform shape upwardly from the bottom of the receptacle, to a point where the surface line of the glass occurs when the receptacle is normally floating in the glass to its line of natural buoyancy. From about this point in the rectangular opening 50, the opposite end faces 51—51' are diverged outwardly at an angle of about thirty degrees above the horizontal and maintain this inclined surface until the intersection thereof with the top surface 52 of the receptacle, as is clearly shown in Fig. 2. The purposes of the particular formation of the drawing receptacle herein shown, and the advantages residing therein are important features in the present invention.

The receptacle 6, is detachably connected by any suitable means to the vertically movable shafts 9—9' to permit of its forced depression within the molten glass 2, and when depressed at a pre-determined position, the molten glass rising within the apertures 50, seeking its natural level with the surface of the glass 2, on the exterior of the receptacle 6, will rise above the line of surface deflection of the faces 51—51', and flow outwardly over the inclined surfaces, a pre-determined distance governed by the depth at which the receptacle 6 is depressed in the molten glass below its natural level of buoyancy. In this position, a thin feather of glass is created between the line of natural glass level and the inclined faces 51—51', of the drawing receptacle 6, and due to the relatively greater mass of refractory material under the feather of glass, there is created a proportionately greater cooling effect on the extended feather portion of the glass, than that portion which lies between the vertical side walls of the aperture 50 in the receptacle.

It is characteristic of the methods heretofore attempted in drawing sheet glass from the main body of a molten mass, that the sheet has a tendency to narrow as the drawing operation proceeds, and this narrowing occurs closely to the molten body or point of greatest plasticity in the sheet. By the use of my improved receptacle, I am able to convey to the glass at this point, a reduction in plasticity effective only in that portion of the batch of glass from which the edges of the sheet are drawn.

The primary object of the novel formation of the glass containing aperture in the receptacle is, to cause the glass to spread out and become relatively cool at such pre-determined portions of its area from which the edge portions of the sheet of glass are drawn. This outward movement of the glass is due to the combined force of the static pressure of the mass of glass, and the capillary attraction the inclined surface 51—51' of the receptacle exercises over the molten glass. This reduction of the volume of the glass proportionately to the volume of the refractory body of the receptacle, creates a novel effect on the glass of not only aiding in the separation of that portion of the glass of which the sheet edges are drawn, from the greater mass of the molten glass within the tank, but creating a change of temperature which produces a resulting hardening effect in the sheet edge producing portion of the outwardly extended feather, before it is moved upward in the drawing operation, which causes the edges of the sheet being drawn, to maintain a substantially vertical line, without the operation of mechanical means for applying and maintaining a lateral tension to the edge of the sheet while being separated from the molten mass. As the sheet of glass is being elevated by the movement of the glass drawing the bait 17, that portion of the glass residing over the inclined faces 51—51', of the drawing receptacle 6, moves upwardly and inwardly from a point outside of the vertical line of the outside edges of the bait, until it has reached the vertical line described by the path of the outside edge of the drawing bait, which becomes the edge line of the sheet being drawn. It is characteristic of the movement of the glass in the use of my novel drawing receptacle 6, to describe the path indicated, of moving outwardly over the inclined faces 51—51', and to then describe an inward curve to the edge line of the sheet, as the sheet is being drawn from the surface of the glass within the receptacle 6, which is clearly shown by the outline of the sheet 45 in Fig. 3. The natural tendency of glass to narrow through a drawing operation is by the use of my improved drawing receptacle, compensated for in first extending the glass outside of the draft line, before draft is applied thereto, and providing means for the constant extension of the glass in this manner during the drawing operation. As the sheet of glass is drawn upward from that portion of the molten glass rising up within the receptacle, the supply is derived from an under feed as contra-distinguished from drawing glass from the surface from a molten mass. By these means I am able to avoid the objectionable features incident to drawing glass from the surface of a molten mass wherein all foreign particles flowing thereon such as cinders, scales, etc., are drawn into the sheet and form blisters, cords and other defects.

In the efforts heretofore attempted to draw sheet glass it has been difficult to procure a definite and uniform thickness to the sheet being drawn, owing to the variations of the temperature of the molten glass, which was required to be maintained at a fixed degree in relation to the speed at which the sheet of glass was drawn. By my improved invention I am able to draw glass of any pre-determined thickness by the novel adjustment of the drawing receptacle and the graduated speed at which the drawing is made in relation to the adjustment of the receptacle. I carry out these means by providing for a greater degree of immersion of the drawing receptacle 6, in the molten glass, when it is desired to draw a sheet of glass of greater thickness, as with the drawing receptacle immersed at a greater degree, the molten glass rising within the rectangular opening 50, creates a greater volume of glass flowing outwardly over the inclined faces 51—51'; and by operating the drawing mechanism at a slower speed, the glass overflow on the faces 51—51' solidifies in a greater volume of thickness and creates a correspondingly thicker edge to the sheet of glass being drawn which in turn has a governing effect on the thickness of the entire sheet. Obviously a lesser degree of immersion of the drawing receptacle 6, and a greater degree of speed of the sheet drawing mechanism will produce a sheet of glass correspondingly thinner.

My apparatus further provides for controlling the degree of thickness of one edge of the glass independent from the other, as the means for operatively immersing the drawing receptacle 6, are connected at the opposite ends thereof, and may be operated independently, I can depress one end of the drawing receptacle to a lower level than the other and thus effect the thickness of the sheet of glass being drawn from the end of the receptacle so adjusted.

The operation of drawing a sheet of glass is as follows:

The drawing receptacle 6, having been immersed in the molten glass 2, for a sufficient period to have properly tempered the glass residing therein, the rollers 31—31' are elevated to a point which will permit of a sufficient space between the surface of the horizontal belts 24 and 41, to admit of the bait 17, and the cross head 44 to be passed between them, and moved forward until the cross head 44 has reached the downward curve of the tracks 42 when by its own gravitation, the bait 17 may be lowered by slackening the cable 17', until the bait 17 passes through the aperture 16, in the top stone 7, and through the drawing chamber 1', and registers with the aperture 50 in the drawing receptacle 6. When the bait has become sufficiently heated by its contact with the molten glass within the aperture 50, of the drawing receptacle 6, to cause the glass to adhere thereto, the end of the cable 17', extending through the aperture 53 in the rear end of the housing 18, is suitably connected to the drawing mechanism (not shown) which is placed in motion and the bait 17 is slowly elevated with the sheet of glass 45, adhering thereto, until the bait comes in contact with the cross head 44, which is carried forward by the movement of the bait until the bait with the sheet of glass depending therefrom has passed over the idlers 145, and the movement of the sheet of glass has been changed from a vertical direction to substantially that of a horizontal plane in which the movement is continued until the bait and cross head have passed out through the opening 53 in the rear end of the housing 18. For the purpose of reducing the area of the opening 53 after the bait and cross head have been passed out, suitable dampers 54—54' are provided. When the bait has reached the outside of the housing 18, and the sheet of glass attached thereto has been deposited upon the movable carrier comprising the endless belt 24 the bait is thereupon detached from the sheet and with the sheet of glass extending over the upper horizontal portion of the belt 24 the rollers 31—31', are moved downward until the belt 41 comes in firm contact with the sheet deposed upon the belt 24. The actuating mechanism (not shown) operating to turn the sprocket wheel 26, is then set in motion which causes the roller 19 to rotate, which in turn carries upon its surface the endless belt 24 causing a draft to be applied to the sheet of glass now disposed between the belts 24 and 41. For the purpose of increasing the draft, the rollers 31—31' carrying the endless belt 41, may be moved downwardly and additional tension brought to bear between the belts 24 and 41, thus providing any degree of draft desired to the sheet of glass being carried thereon.

The drawing bait with its accessories need not be again used until it is desired to initiate another drawing operation, as with my improved apparatus I am able to draw a continuous sheet as long as there is a suitable supply of glass within the tank to feed the flow of glass rising within the aperture 50 of the drawing receptacle 6.

As the sheet of glass emerges from the aperture 53 in the rear end of the housing 18, any suitable means may be employed for supporting the same and moving it forward to a cutting table, where it may be severed into suitable lengths by methods well known in the art.

Many of the features of this invention may be used without employing all of them, and some of those which are non-essential may be omitted without departing from the spirit of the invention though the omission may to a greater or less extent affect the quality of the product. Moreover the apparatus portion of the invention is capable of receiving various mechanical expressions without departing from the spirit of the invention itself.

Having thus described my invention what I claim, and desire to secure by Letters Patent, is:

1. The method of making sheet glass, which consists in creating within a mass of molten glass, an area of relatively reduced temperature by surrounding a portion of the molten mass within a hollow refractory body, regulating the temperature of each edge producing portion of such mass by the immersion of either end of the refractory medium, and drawing a sheet of glass from the area within said refractory body.

2. The method of drawing sheet glass, which consists in reducing the temperature in a bath of molten glass by isolating a portion thereof within an area surrounded by a hollow refractory body, partially separating from the molten mass, the portion from which the sheet edge is drawn by interposition between such edge producing portion and the mass of glass in said tank, a refractory body, regulating the temperature of the various portions of the bath by adjusting the depth of immersion of the refractory body, and drawing a sheet of glass from within said refractory body.

3. The method of drawing sheet glass, which consists in creating a glass drawing zone of relatively reduced temperature in a bath of molten glass, by surrounding said zone with a hollow refractory body, extending outwardly the sheet edge producing portion over said refractory body, regulating the outward extension of each sheet edge producing portion by adjusting the depth of immersion of either end of the refractory body, drawing a sheet of glass from within said refractory body, resting said sheet upon a suitable carrier, continuing the drawing operation by applying draft to the sheet through the frictional contact of the sheet with said carrier.

4. The method of drawing sheet glass, which consists in creating a glass drawing zone of relatively reduced temperature in a bath of molten glass, by surrounding said zone with a hollow refractory body, reducing the depth of the mass of molten glass from which the sheet edge portions are drawn, regulating the depth of each sheet edge producing portion of the bath by adjusting the depth of immersion of either end of the refractory body, drawing a sheet of glass from the combined depths within the area of said refractory body, depositing the sheet upon a movable carrier continuing the drawing operation by applying draft to the sheet through the frictional contact of the sheet with said carrier.

In testimony whereof I have affixed my signature in presence of two witnesses.

ALBERT A. ICENHOUR.

Witnesses:
HENRY K. POWERS,
HARRY E. OLLINGER.